United States Patent
Bian

(10) Patent No.: US 10,207,945 B2
(45) Date of Patent: Feb. 19, 2019

(54) SYSTEM FOR IMPROVING SLUDGE WATER INTO ECOLOGICAL WATER SYSTEM

(71) Applicant: Zhengkui Bian, Jiangsu (CN)

(72) Inventor: Zhengkui Bian, Jiangsu (CN)

(*) Notice: Subject to any disclaimer, the term of this patent is extended or adjusted under 35 U.S.C. 154(b) by 72 days.

(21) Appl. No.: 15/362,727

(22) Filed: Nov. 28, 2016

(65) Prior Publication Data

US 2018/0148363 A1     May 31, 2018

(51) Int. Cl.
| | | |
|---|---|---|
| *C02F 11/12* | (2006.01) | |
| *C02F 1/00* | (2006.01) | |
| *C02F 3/20* | (2006.01) | |
| *B01D 29/15* | (2006.01) | |
| *C02F 103/00* | (2006.01) | |

(52) U.S. Cl.
CPC ............ *C02F 11/127* (2013.01); *B01D 29/15* (2013.01); *C02F 1/004* (2013.01); *C02F 3/20* (2013.01); *C02F 2103/007* (2013.01)

(58) Field of Classification Search
CPC .............................. C02F 11/127; C02F 1/004; C02F 3/20; C02F 2103/007; B01D 29/15
See application file for complete search history.

(56) References Cited

U.S. PATENT DOCUMENTS

| | | | | |
|---|---|---|---|---|
| 4,780,219 | A * | 10/1988 | Witek | .................... B01D 24/10 210/269 |
| 5,744,037 | A * | 4/1998 | Fujimura | .................. C02F 3/12 110/245 |
| 2003/0010727 | A1* | 1/2003 | Gunderson, III | ...... B01D 17/00 210/803 |
| 2008/0237150 | A1* | 10/2008 | Chekroun | ............... C02F 11/14 210/770 |

* cited by examiner

*Primary Examiner* — Dirk R Bass

(57) ABSTRACT

A system for improving sludge water into ecological water system, including a water area separator, a sludge dehydrator and a water filtration device, the water area separator separates the water area to be treated by a water barrier, the sludge dehydrator dehydrates the sludge by a centrifugal sieve; the water filtration device includes a suction pipe, a water pump, an inlet pipe, a filter bag, a steel cage and a drainage pipe. The system for improving sludge water into ecological water system has the mechanism of to separate the water area by the water area separator, then rapidly dehydrate the sludge by the sludge dehydrator, remove sundries from the treated sludge water by the water filtration device, and finally drains the water filtered after adding microbubbles, and thus to realize the improvement of sludge water into ecological water system.

12 Claims, 3 Drawing Sheets

SYSTEM FOR IMPROVING SLUDGE WATER INTO ECOLOGICAL WATER SYSTEM

TECHNICAL FIELD

The Invention relates to the technical field of water improvement, in particular to a system for improving sludge water into ecological water system.

BACKGROUND ART

In many cities in China, rivers and lakes are severely polluted, causing a loss of 37.7 billion yuan. Therefore, sludge treatment of urban rivers and lakes is imminent. Nevertheless, there is no good treatment measure to improve the sludge water of rivers and lakes into ecological water system. Moreover, due to high water content and large transport volume of sludge, centralized treatment is required when the sludge is in solid state after local dehydration for volume reduction. Calculated as per 80% of water content, the total sludge water yield will soon break through 30 million tons, imposing a very rigorous situation of sludge treatment.

Therefore, it is necessary to develop the solutions to improving sludge water into ecological water system.

SUMMARY OF THE INVENTION

To overcome the shortages of the prior arts and solve the existing technical defects, the Invention is to provide a system for improving sludge water into ecological water system.

Provide herein is a system for improving sludge water into ecological water system, comprising a water area separator, a sludge dehydrator and a water filtration device, wherein:

the water area separator comprises an upper netting rope, a floating bank, a water barrier, a dropping bank and a lower netting rope; the floating bank passes through onto the upper netting rope, and the dropping bank passes through onto the lower netting rope, the upper end of the water barrier is connected with the floating bank while the lower end is connected with the dropping bank;

the sludge dehydrator comprises a frame and a motor, a bearing box, a centrifugal sieve and a sludge inlet pipe set on the frame in turn. The motor is connected with the bearing box via the main shaft. On the main shaft an elastic coupling is mounted, the centrifugal sieve is mounted on the main shaft and the sludge inlet pipe is mounted at the center of the centrifugal sieve;

the water filtration device comprises a suction pipe, a water pump, an inlet pipe, a filter bag, a steel cage and a drainage pipe. The suction pipe, the water pump and the inlet pipe are connected in turn, wherein, one end of the inlet pipe is set in the filter bag. The filter bag is set in the steel cage; the bottom of the steel cage is provided with a funnel that is connected to the drainage pipe;

the water area separator separates the water area to be treated;

the sludge dehydrator dehydrates the sludge in the sludge area separated; and the water filtration device filtrates the sludge water after treatment by the sludge dehydrator, to remove the sundries in the sludge. The water filtration device is connected with a bubble generator that can add bubbles to the filtrated water to make the filtrated water allowed to be discharged into rivers.

Further, the water barrier is integrated with the floating bank and the dropping bank.

Further, the centrifugal sieve comprises a filter screen, a sieve base and a collar. The bell mouth of the filter screen is provided with the collar and the sieve base is mounted on the frame.

Further, the bottom of the centrifugal sieve is provided with a turbid water funnel.

Further, the right side of the centrifugal sieve is provided with a mud funnel.

Further, the port of the centrifugal sieve is provided with a direction stabilizing wheel and the direction stabilizing wheel is mounted on the sieve base.

Further, the sludge inlet pipe is provided with a spherical filter screen.

Further, the top end of the steel cage is provided with a first hasp; the steel cage comprises a cage body and a base plate, wherein one end of the base plate is hinged with the cage body and the other end and the cage body are provided with a second hasp.

Further, the top end of the filter screen is provided with a twist tie.

Compared with the prior arts, the Invention has the beneficial effects as follows:

The invention discloses a system for improving sludge water into ecological water system, the process of the invention is to separate the water area by the water area separator, then rapidly dehydrate the sludge by the sludge dehydrator, remove sundries from the treated sludge water by the water filtration device, and finally drains the filtered water after adding bubbles into the river, and thus to realize the improvement of sludge water into ecological water system.

The Invention is further described in combination with the drawings as follows.

DESCRIPTION OF EMBODIMENTS

A clear and full description of the technical schemes in the embodiments of the Invention will be given in combination of the drawings and the embodiments of the Invention. Obviously, the described embodiments are only for illustrating the technical scheme of the Invention more clearly, rather than the limitations of protection scope of the Invention.

Figure 1:
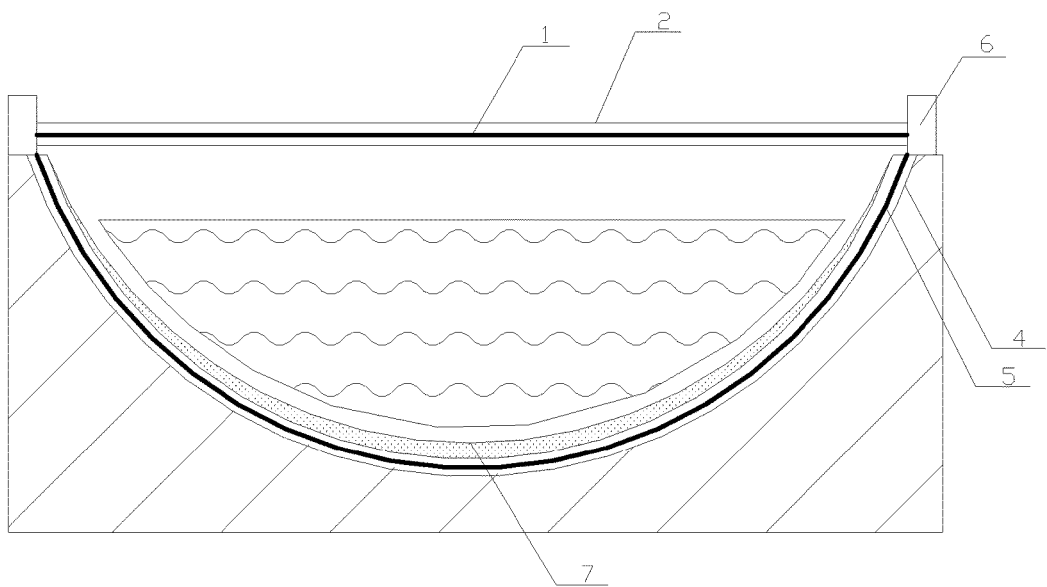
FIG. 1 is a section structural diagram of the water area separator of the Invention.
Figure 2:
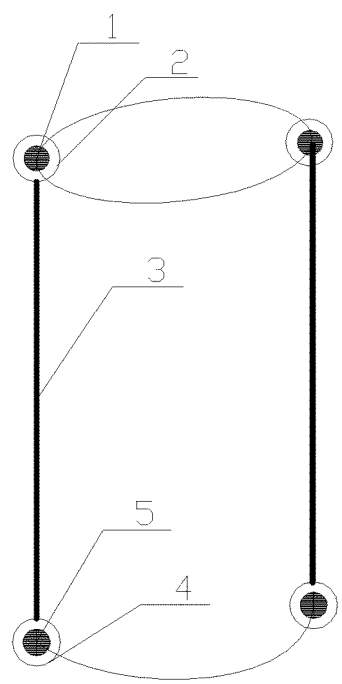
FIG. 2 is a cylindrical structural diagram of the water area separator of the Invention.
Figure 3:
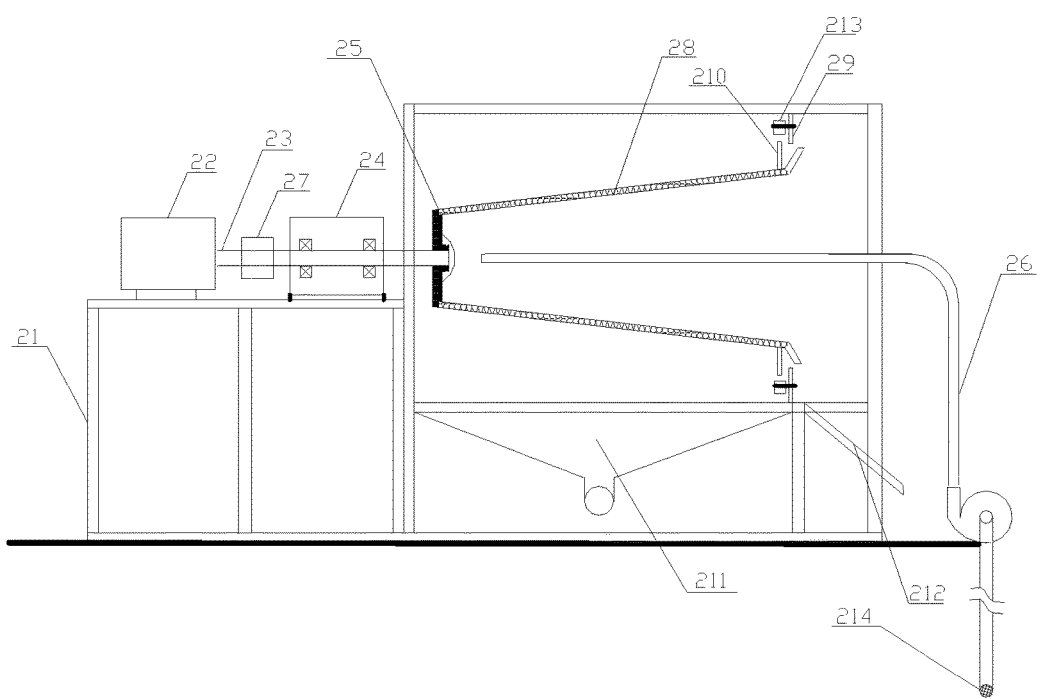
FIG. 3 is a structural diagram of the sludge dehydrator of the Invention.
Figure 4:
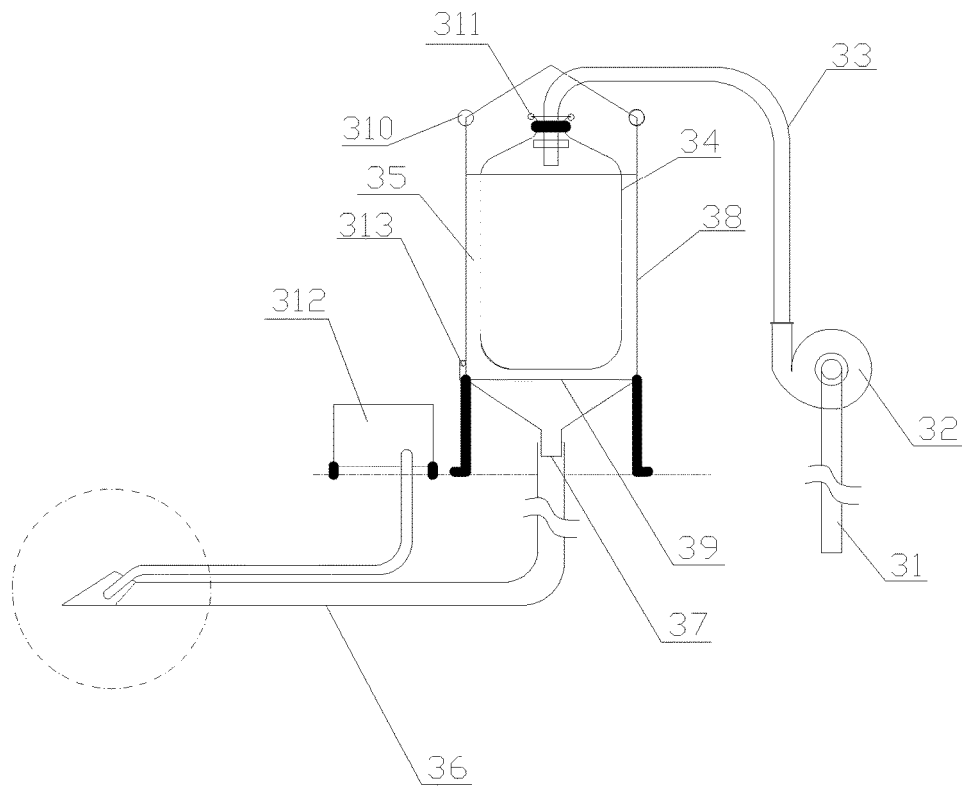
FIG. 4 is a structural diagram of the water filtration device of the Invention.
Figure 5:
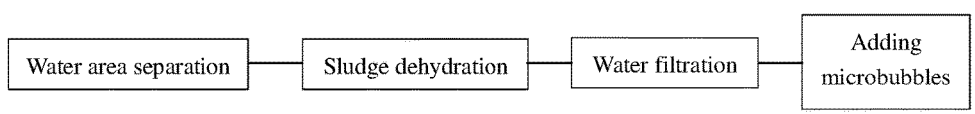
FIG. 5 is a schematic diagram of the treatment flow of the Invention. In the drawings, 1. Upper netting rope 2. Floating bank 3. Water barrier 4. Dropping bank 5. Lower netting rope 6. Riveting pile 7. Sludge zone 21. Frame 22. Motor 23. Main shaft 24. Bearing box 25. Centrifugal sieve 26. Sludge inlet pipe 27. Elastic coupling 28. Filter screen 29. Sieve base 210. Collar 211. Turbid water funnel 212. Mud funnel 213. Direction stabilizing wheel 214. Spherical filter screen 31. Suction pipe 32. Water pump 33. Inlet pipe 34. Filter bag 35. Steel cage 36. Drainage pipe 37. Funnel 38. Cage body 39. Base plate 310. First hasp 311. Twist tie 312. Bubble generator 313. Second hasp.

As shown in FIGS. 1-5, the Invention provides a system for improving sludge water into ecological water system, including a water area separator, a sludge dehydrator and a water filtration device, The water area separator comprises an upper netting rope 1, a floating bank 2, a water barrier 3, a dropping bank 4 and a lower netting rope 5; the floating bank 2 passes through onto the upper netting rope 1, and the dropping bank 4 passes through onto the lower netting rope 5, the upper end of the water barrier 3 is connected with the floating bank 2 while the lower end of the water barrier 3 is connected with the dropping bank 4; the water barrier 3 is integrated with the floating bank 2 and the dropping bank 4

The sludge dehydrator including a frame 21 and a motor 22, a bearing box 24, a centrifugal sieve 25 and a sludge inlet pipe 26 set on the frame 21 in turn. The motor 22 is connected with the bearing box 24 via the main shaft 23. An elastic coupling 27 is mounted on the main shaft 23, the centrifugal sieve 25 is mounted on the main shaft 23 and the sludge inlet pipe 26 is mounted at the center of the centrifugal sieve 25; the centrifugal sieve 25 includes a filter screen 28, a sieve base 29 and a collar 210. The bell mouth of the filter screen 28 is provided with the collar 210 and the sieve base 29 is mounted on the frame 21. The bottom of the centrifugal sieve 25 is provided with a turbid water funnel 211. The right side of the centrifugal sieve 25 is provided with a mud funnel 212. The port of the centrifugal sieve 25 is provided with a direction stabilizing wheel 213 which is mounted on the sieve base 29, and the sludge inlet pipe 26 is provided with a spherical filter screen 214.

The water filtration device includes a suction pipe 31, a water pump 32, an inlet pipe 33, a filter bag 34, a steel cage 35 and a drainage pipe 36. The suction pipe 31, the water pump 32 and the inlet pipe 33 are connected in turn, wherein, one end of the inlet pipe 33 is set in the filter bag 34. The filter bag 34 is set in the steel cage 35, the bottom of the steel cage 35 is provided with a funnel 37 that is connected to the drainage pipe 36; the top end of the steel cage 35 is provided with a first hasp 310, and the steel cage 35 includes a cage body 38 and a base plate 39, wherein one end of the base plate 39 is hinged with the cage body 38 and the other end and the cage body 38 are provided with a second hasp 313, and the top end of the filter bag 34 is provided with a twist tie 311.

To meet the separation demands of water areas, the floating bank 2 of the water area separator may be adjusted or assembled, in linear type or cylindrical type. If the linear type is adopted, two ends of the floating bank 2 are provided with riveting piles for securing the water area separator.

The embodiment of the sludge dehydrator of the Invention has such a mechanism that when the sludge dehydrator runs, the motor 22 starts and drives the centrifugal sieve 25 via the elastic coupling 27, meanwhile, the sludge inlet pipe 26 delivers the sludge into the centrifugal sieve 25 that runs to drain the water in the sludge to the turbid water funnel 211 through the filter screen 28, and discharge the mud after filtration into the mud funnel 212 for sludge dehydration.

To prevent access of alien debris into the centrifugal sieve 25 and cause damage to the centrifugal sieve 25, the sludge inlet pipe is provided with a spherical filter screen 214.

To prevent deviation of the centrifugal sieve 25 from the run rail, the port of the centrifugal sieve 25 is provided with a direction stabilizing wheel 213 to ensure the operation of the centrifugal sieve 25.

For the water filtration device of the Invention, to facilitate the cleaning of sundries by the filter bag 34, the bottom of the filter bag 34 is designed as through-type, so that the sundries in the filter bag 34 can fall into the truck hopper when the base plate 39 of the steel cage is opened.

For more clean water drained, beside the water filtration device, a bubble generator 312 is provided, of which the pipe outlet is connected with the drainage pipe 36, making the micro sundries drained floating up to the water for further cleaning.

It shall be noted that the above embodiment is only for description of the Invention, instead of limitation to the protection scope of the Invention. All equivalent replacements or changes based on the technical solutions of the specification made by a person skilled in the art shall be included within the protection scope of the Invention, provided that such replacements or changes do not exceed the contents or scope of the Invention.

What is claimed is:

1. A system for improving sludge water into ecological water system, comprising a water area separator, a sludge dehydrator and a water filtration device, wherein, The water area separator comprises a first rope net, a floater, a water barrier, a sinker and a second rope net; the floater passes through onto the first rope net, and the sinker passes through onto the second rope net, the upper end of the water barrier is connected with the floater while the lower end of the water barrier is connected with the sinker;

The sludge dehydrator comprises a frame and a motor, a bearing box, a centrifugal sieve and a sludge inlet pipe set on the frame in turn, the motor is connected with the bearing box via the main shaft, on the main shaft an elastic coupling is mounted, the centrifugal sieve is mounted on the main shaft and the sludge inlet pipe is mounted at the center of the centrifugal sieve;

The water filtration device comprises a suction pipe, a water pump, an inlet pipe, a filter bag, a steel cage and a drainage pipe, the suction pipe, the water pump and the inlet pipe are connected in turn, wherein, one end of the inlet pipe is set in the filter bag; the filter bag is set in the steel cage; the bottom of the steel cage is provided with a funnel that is connected to the drainage pipe;

The water area separator separates a water area to be treated;

The sludge dehydrator dehydrates sludge in a sludge area separated; and

The water filtration device filters a sludge water after treatment by the sludge dehydrator, to remove the sundries in the sludge; the water filtration device is connected with a bubble generator.

2. The system for improving sludge water into ecological water system according to claim 1, wherein, the water barrier is integrated with the floater and the sinker.

3. The system for improving sludge water into ecological water system according to claim 1, wherein, the centrifugal sieve comprises a filter screen, a sieve base and a collar; the bell mouth of the filter screen is provided with the collar and the sieve base is mounted on the frame.

4. The system for improving sludge water into ecological water system according to claim 1, wherein, the bottom of the centrifugal sieve is provided with a turbid water funnel.

5. The system for improving sludge water into ecological water system according to claim 1, wherein, the right side of the centrifugal sieve is provided with a mud funnel.

6. The system for improving sludge water into ecological water system according to claim 1, wherein, the port of the centrifugal sieve is provided with a direction stabilizing wheel which is mounted on the sieve base.

7. The system for improving sludge water into ecological water system according to claim 1, wherein, the sludge inlet pipe is provided with a spherical filter screen.

8. The system for improving sludge water into ecological water system according to claim 1, wherein, the top end of the steel cage is provided with a first hasp, and the steel cage comprises a cage body and a base plate, wherein one end of the base plate is hinged with the cage body, the other end and the cage body are provided with a second hasp.

9. The system for improving sludge water into ecological water system according to claim 1, wherein, the top end of the filter screen is provided with a twist tie.

10. The system for improving sludge water into ecological water system according to claim 3, wherein, the bottom of the centrifugal sieve is provided with a turbid water funnel.

11. The system for improving sludge water into ecological water system according to claim 3, wherein, the right side of the centrifugal sieve is provided with a mud funnel.

12. The system for improving sludge water into ecological water system according to claim 3, wherein, the port of the centrifugal sieve is provided with a direction stabilizing wheel which is mounted on the sieve base.

* * * * *